Dec. 26, 1967  G. JUSTICE  3,360,727
METER BRIDGE CIRCUIT INCLUDING SIGNAL-BIASED AMPLIFIER
FOR PROVIDING D.C. CURRENT TO GROUNDED LOAD
Filed Nov. 16, 1964
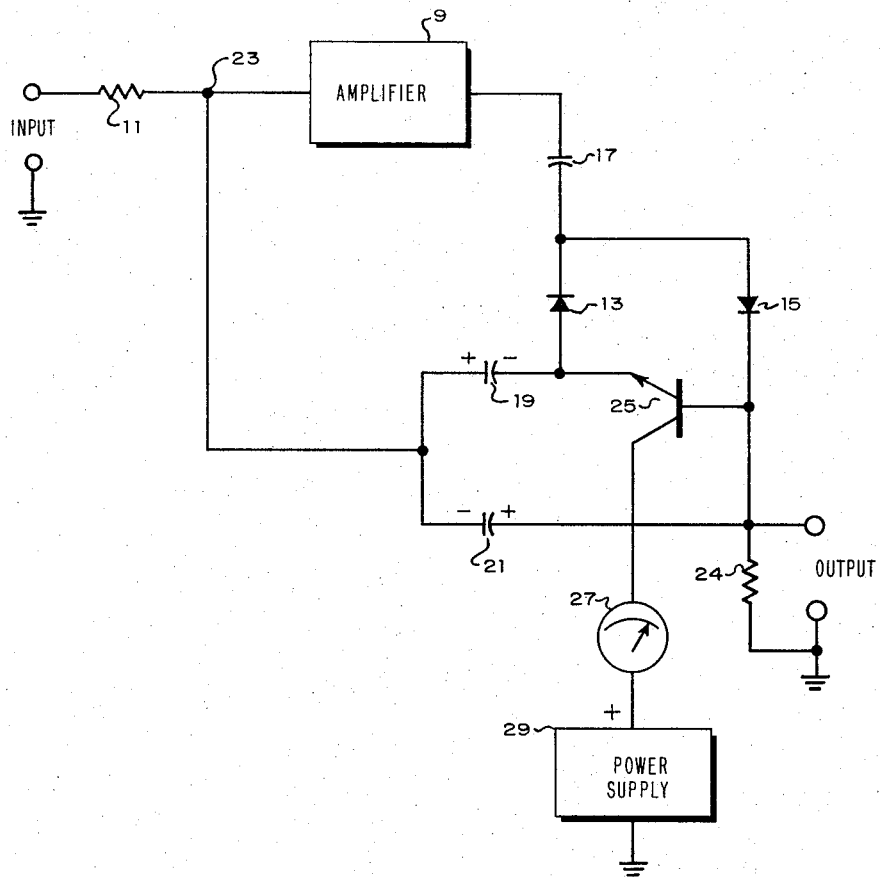
INVENTOR
GREGORY JUSTICE
BY  G. C. Smith
ATTORNEY United States Patent Office 3,360,727
Patented Dec. 26, 1967

3,360,727
METER BRIDGE CIRCUIT INCLUDING SIGNAL-BIASED AMPLIFIER FOR PROVIDING D.C. CURRENT TO GROUNDED LOAD
Gregory Justice, Mountain View, Calif., assignor to Hewlett-Packard Company, Palo Alto, Calif., a corporation of California
Filed Nov. 16, 1964, Ser. No. 411,458
2 Claims. (Cl. 324—123)

ABSTRACT OF THE DISCLOSURE

A meter bridge circuit in the signal feedback path of an operational amplifier includes a signal-biased transistor amplifier across the bridge output terminal which provides a wide range of collector currents into a grounded load for operation on low level A.C. signal of substantially constant peak-to-peak value.

This invention relates to a circuit for driving a D.C. meter from an A.C. signal source and for producing a D.C. output in accordance with the amplitude of the applied A.C. signal. The present invention obviates the need in conventional circuits for a large amplitude A.C. signal to produce a linearly related direct current signal of small amplitude.

It is an object of the present invention to provide an inexpensive meter bridge circuit which may be driven by a relatively low amplitude alternating signal to produce a direct current signal having an amplitude which may vary over a wide dynamic range.

It is another object of the present invention to provide a meter bridge circuit in the feedback path around an amplifier which enables the meter to operate at alternating signal ground.

It is still another object of the present invention to provide an improved meter circuit.

In accordance with the illustrated embodiment of the present invention, a low input impedance transistor amplifier is connected across the diagonals of a rectifier bridge in place of the conventional meter connection. The indicating meter is connected to the output of the amplifier and a D.C. output is obtained from a rectifying element in one arm of the meter bridge.

These and other objects of the present invention will be apparent from a reading of this specification and an inspection of the accompanying drawing which shows a schematic diagram of the meter circuit of the present invention.

Referring to the drawing, an alternating signal to be measured is applied to the gain inverting amplifier 9 through resistor 11. An alternating current at the output of amplifier 9 is applied to a pair of oppositely poled diodes 13, 15 through a capacitor 17. The remaining terminals of the diodes 13, 15 are connected to the emitter and base electrodes of transistor 25 and are also connected through capacitors 19, 21 to the input of amplifier 9 to form an operational-type amplifier having a virtual ground node 23 at its input. Thus, the positive half cycle of alternating current at the output of amplifier 9 flows through diode 15 and capacitor 21 to the node 23, thereby charging capacitor 21. A resistor 24 connected between the common connection of diode 15 and capacitor 21 and a source of reference potential, say ground, thus conducts a direct current substantially equal to the average value of the A.C. current during the positive half cycle. The negative half cycle of A.C. signal from the output of amplifier 9 flows through diode 13 and capacitor 19 to virtual ground node 23, thereby charging capacitor 19. This causes a D.C. current having a value substantially equal to the average A.C. current during the negative half cycle to flow to ground through the transistor 25 and through the meter 27 and power supply 29 serially connected to the collector of transistor 25. The return path for D.C. current is from ground through resistor 24 to capacitor 21. Charge lost by capacitors 19 and 21 is replenished each cycle by the diodes 13 and 15.

The connection of the emitter and base electrodes of transistor 25 as shown presents very low impedance to a potential difference across the diagonals of the bridge circuit. Thus the peak to peak signal swing at the output of amplifier 9 is substantially constant regardless of D.C. output current in meter 27 and is approximately equal to the combined energy gaps of diodes 13 and 15 and the base-emitter junction voltage of transistor 25 (plus the small voltage drop across the forward conduction resistance of the three devices). The D.C. output current is substantially equal to the average value of the rectified A.C. current from amplifier 9. Also, the D.C. output voltage across resistor 24 may vary over a wide range of values (limited by the voltage of power supply 29) for only a small peak to peak voltage swing on the output of amplifier 9. No additional filtering is required to smooth the D.C. voltage present across resistor 24 with respect to ground when the circuit is used in the operational amplifier configuration because capacitor 21, connected on one side to the virtual ground node 23, acts as the filter capacitor. Further, since the indicating meter 27 is connected in the collector circuit of transistor 25, it is isolated from the A.C. signal in the feedback path by the high collector resistance. Any distributed capacitance of the meter 27 to surrounding mounting structures thus has negligible effect on high frequency performance.

The circuit of the present invention may also be operated as a synchronous detector merely by replacing the diodes 13, 15 with switching elements which are operated at a selected frequency. Transistor 25 is then replaced by a low impedance, bilaterally conductive amplifier such as a pair of complementary conductivity type transistors having the bases and emitters connected together and having suitable bias circuitry and output circuitry connected to the collectors.

I claim:
1. An electrical circuit comprising:
   a source of alternating signal;
   a bridge circuit including a diode in each of two bridge arms having a first common junction therebetween and including a capacitor in each of the two remaining arms having a second common junction therebetween;
   circuit means connected to said source and to said first and second common junctions of the bridge circuit for conducting only alternating signal current therethrough from said source;
   a transistor connected to receive bias from the bridge circuit and having a base electrode connected to a first common connection of a diode in one arm and a capacitor in one arm and having an emitter electrode connected to a second common connection of another diode in another arm and another capacitor in another arm and having a collector electrode;
a utilization circuit; and
direct-current conducting means connecting the utilization circuit between the collector electrode and said first common connection.

2. An electrical circuit as in claim 1 wherein:
said circuit means includes a capacitor connecting said source to said first common junction; and
said utilization circuit includes a D.C. power supply, a resistor and an indicating meter serially connected between said collector electrode and said first common connection.

References Cited

UNITED STATES PATENTS

| | | | |
|---|---|---|---|
| 2,203,485 | 6/1940 | Bentley | 323—75 |
| 2,255,190 | 9/1941 | Ryall | 330—110 X |
| 2,521,522 | 9/1950 | Keitley | 324—119 X |
| 2,944,218 | 7/1960 | Newbold | 324—119 X |
| 3,184,728 | 5/1965 | Hart et al. | 323—75 |

RUDOLPH V. ROLINEC, *Primary Examiner.*

E. F. KARLSEN, *Assistant Examiner.*